United States Patent
Sheedy et al.

(10) Patent No.: US 12,030,820 B2
(45) Date of Patent: Jul. 9, 2024

(54) HIGH TEMPERATURE FIBER, METHOD OF MAKING AND HIGH TEMPERATURE FIBER COMPOSITES

(71) Applicant: RTX Corporation, Farmington, CT (US)

(72) Inventors: Paul Sheedy, Bolton, CT (US); Neal Magdefrau, Tolland, CT (US); Wayde R. Schmidt, Pomfret Center, CT (US)

(73) Assignee: RTX CORPORATION, Farmington, CT (US)

( * ) Notice: Subject to any disclaimer, the term of this patent is extended or adjusted under 35 U.S.C. 154(b) by 489 days.

(21) Appl. No.: 16/536,725

(22) Filed: Aug. 9, 2019

(65) Prior Publication Data

US 2021/0039999 A1 Feb. 11, 2021

(51) Int. Cl.
C04B 35/80 (2006.01)
C04B 35/628 (2006.01)
C04B 41/89 (2006.01)
C04B 111/00 (2006.01)

(52) U.S. Cl.
CPC ........ C04B 35/80 (2013.01); C04B 35/62849 (2013.01); C04B 35/62855 (2013.01); C04B 41/89 (2013.01); C04B 2111/00379 (2013.01)

(58) Field of Classification Search
CPC .............. C04B 35/80; C04B 35/62884; C04B 2235/5284
See application file for complete search history.

(56) References Cited

U.S. PATENT DOCUMENTS

| | | |
|---|---|---|
| 4,942,011 A | 7/1990 | Bolt et al. |
| 5,204,380 A | 4/1993 | Seyferth et al. |
| 5,558,907 A | 9/1996 | Steffier |
| 5,783,139 A | 7/1998 | Curran |
| 6,299,988 B1 | 10/2001 | Wang et al. |
| 6,322,889 B1 | 11/2001 | Lara-Curzio et al. |
| 6,979,490 B2 | 12/2005 | Steffier |
| 8,617,652 B2 | 12/2013 | Lee |
| 8,906,814 B2 | 12/2014 | Lee et al. |
| 9,376,750 B2 | 6/2016 | George et al. |

(Continued)

FOREIGN PATENT DOCUMENTS

| | | |
|---|---|---|
| CN | 104213099 A | 12/2014 |
| EP | 3556740 A1 | 10/2019 |

(Continued)

OTHER PUBLICATIONS

Kayaci et al., "Polymer-Inorganic Core-Shell Nanofibers by Electrospinning and Atomic Layer Deposition: Flexible Nylon-ZnO Core-Shell Nanofiber Mats and Their Photocatalytic Activity," 2012, Appl. Mater. Interfaces 4, pp. 6185-6194. (Year: 2012).*

European Extended Seach Report for European Application No. 20188054.9; Application Filing Date: Jul. 28, 2020, dated Dec. 10, 2020; 9 pages.

(Continued)

*Primary Examiner* — Robert A Vetere

(74) *Attorney, Agent, or Firm* — CANTOR COLBURN LLP

(57) ABSTRACT

Disclosed is a method of making high temperature fiber including chemically bonding high temperature material to a fiber template at a first temperature to form a precursor fiber and processing the precursor fiber at a second temperature to form the high temperature fiber. The first temperature does not equal the second temperature. Also disclosed are high temperature fibers made by the method.

11 Claims, 1 Drawing Sheet

(56) References Cited

U.S. PATENT DOCUMENTS

| | | | |
|---|---|---|---|
| 9,834,849 | B2 | 12/2017 | Sammelselg et al. |
| 10,092,927 | B2 | 10/2018 | George et al. |
| 2004/0138046 | A1 | 7/2004 | Sherwood, Jr. et al. |
| 2005/0181192 | A1 | 8/2005 | Steffier |
| 2008/0119098 | A1 | 5/2008 | Palley et al. |
| 2009/0137043 | A1 | 5/2009 | Parsons et al. |
| 2010/0130082 | A1 | 5/2010 | Lee et al. |
| 2010/0260998 | A1 | 10/2010 | Waicukauski et al. |
| 2011/0155062 | A1 | 6/2011 | Kato et al. |
| 2012/0040581 | A1* | 2/2012 | Kim .................. D01F 1/10 526/341 |
| 2013/0025458 | A1 | 1/2013 | Li et al. |
| 2015/0291473 | A1 | 10/2015 | Schmidt |
| 2016/0159694 | A1 | 6/2016 | Chamberlain et al. |
| 2016/0265143 | A1* | 9/2016 | Garnier ............ C04B 35/62277 |
| 2016/0326672 | A1* | 11/2016 | Higuchi ................. D01F 9/225 |
| 2017/0141383 | A1 | 5/2017 | Dadheech et al. |
| 2017/0190629 | A1 | 7/2017 | Lakrout et al. |
| 2017/0327948 | A1* | 11/2017 | Dadheech .......... C23C 16/4417 |
| 2017/0342844 | A1 | 11/2017 | Schmidt et al. |
| 2018/0327327 | A1 | 11/2018 | Suyama et al. |
| 2019/0322595 | A1 | 10/2019 | Magdefrau et al. |
| 2021/0039998 | A1 | 2/2021 | Sheedy et al. |
| 2021/0040651 | A1 | 2/2021 | Sheedy et al. |
| 2021/0075016 | A1 | 3/2021 | Choi et al. |

FOREIGN PATENT DOCUMENTS

| | | | |
|---|---|---|---|
| GB | 2467928 | A | 8/2010 |
| KR | 101855718 | B1 | 5/2018 |
| WO | 2013142344 | A1 | 9/2013 |

OTHER PUBLICATIONS

Putkonen, et al., "Atomic layer deposition of Ti—Nb—O thin films onto electrospun fibers for fibrous and tubular catalyst support structures", J. Vac. Sci. Technol. A 36(1), Jan./Feb. 2018, 7 pages.
Bernardo et al., Advanced Ceramics from Preceramic Polymers Modified at the Nano-Scale: A Review, Materials, 2014, 30 pages.
Extended European Search Report for European Application No. 20188050.7; Application Filing Date: Jul. 28, 2020, dated Nov. 5, 2020; 7 pages.
Militzer et al., "Deposition of an organic-inorganic hybrid material onto carbon fibers via the introduction of furfuryl alcohol into the atomic layer deposition process of titania and subsequent pyrolysis", Journal of Vacuum Science and Technology: Part A, AVS/AIP, vol. 35, No. 1, Nov. 9, 2016, 13 pages.
Extended European Search Report issued in Application No. 20190288.9 dated Dec. 10, 2020, 12 pages.
Notice of Allowance issued in U.S. Appl. No. 16/536,688 dated Apr. 19, 2022, 9 pages.
Raj N. Singh, "High-Temperature Mechanical Properties of a Uniaxially Reinforced Zircon-Silicon Carbide Composite", Journal of the American Ceramic Society, vol. 73, No. 8, Aug. 1990, pp. 2399-2406.
Restriction Requirement issued in U.S. Appl. No. 16/536,688 dated Jun. 16, 2021, 7 pages.
U.S. NonFinal Office Action; U.S. Appl. No. 16/536,688, dated Nov. 8, 2021; 23 Pages.
U.S. Notice of Allowance for U.S. Appl. No. 16/536,688 dated Aug. 30, 2022, pp. 1-12.
U.S. Restriction Requirement for U.S. Appl. No. 16/536,742 dated Oct. 13, 2022, pp. 1-6.
European Office Action for EP Application No. 20188050.7, dated Feb. 23, 2023, pp. 1-5.

* cited by examiner

HIGH TEMPERATURE FIBER, METHOD OF MAKING AND HIGH TEMPERATURE FIBER COMPOSITES

BACKGROUND

Exemplary embodiments pertain to the art of high temperature fibers and high temperature fiber composites, including ceramic matrix composites.

Composite components are finding increased use in aerospace applications due to their unique, tailorable properties which can result in significant weight savings, increased performance and durability, as well as reductions in specific fuel consumption. In particular, gas turbine engines, such as aircraft engines, operate in severe environments and show significant benefit from incorporation of composite materials. Additionally, other aerospace components, such as aircraft brakes and friction materials, can benefit from incorporating composite materials.

As an example, ceramic matrix composite (CMC) components have desirable high temperature mechanical, physical, and chemical properties which allow gas turbine engines to operate at much higher temperatures with significant weight savings as compared to current engines with superalloy components. Ceramic matrix composites include fibers embedded in a ceramic matrix. There is an ongoing need for fibers with increased oxidation resistance and temperature resistance.

BRIEF DESCRIPTION

Disclosed is a method of making high temperature fiber including chemically bonding material to a fiber template at a first temperature to form a precursor fiber and processing the precursor fiber at a second temperature to form the high temperature fiber.

In addition to one or more of the features described above, or as an alternative to any of the foregoing embodiments, the fiber template comprises aluminum oxide, zirconium oxide, yttrium oxide, titanium dioxide, mullite, aluminosilicate, zirconium oxide, yttrium aluminum garnet, SiC, SiNC, SiOC, SiCNO, SiBCN, BN, $Si_3N_4$, SiAlCN, SiC/AlN, geopolymers, basalt, a carbide such as boron carbide, HfC, ZrC, carbon, S-glass, E-glass, A-glass, D-glass, silica, and combinations thereof.

In addition to one or more of the features described above, or as an alternative to any of the foregoing embodiments, the fiber template may be a hollow tube and chemically bonding the material to the fiber template occurs on the inside of the tube, the outside of the tube or both.

In addition to one or more of the features described above, or as an alternative to any of the foregoing embodiments, the material bonded to the fiber template comprises a nitride, carbide, boride, oxide, phosphide, selenide, silicide, precursors to the foregoing, or combination thereof.

In addition to one or more of the features described above, or as an alternative to any of the foregoing embodiments, the method includes pretreating the fiber template before chemically bonding.

In addition to one or more of the features described above, or as an alternative to any of the foregoing embodiments, the high temperature fiber includes a central portion and the central portion comprises a doped composition. The high temperature fiber may consist of the central portion.

In addition to one or more of the features described above, or as an alternative to any of the foregoing embodiments, the high temperature fiber includes a central portion and the central portion includes more than one phase. The high temperature fiber may consist of the central portion.

In addition to one or more of the features described above, or as an alternative to any of the foregoing embodiments, chemically bonding occurs by atomic layer deposition.

Also disclosed herein is a high temperature fiber comprising a first region and a second region wherein the first region differs from the second region by average grain size, microstructure or a combination thereof.

In addition to one or more of the features described above, or as an alternative to any of the foregoing embodiments, the first region surrounds the second region and the average grain size of the first region is less than the average grain size of the second region.

In addition to one or more of the features described above, or as an alternative to any of the foregoing embodiments, the high temperature fiber further includes a third region having an average grain size that is the same as the first region or the second region.

In addition to one or more of the features described above, or as an alternative to any of the foregoing embodiments, the first region consists of a single phase and the second region comprises two phases. The first region may surround the second region or the second region may surround the first region.

Also disclosed herein is a high temperature fiber including a central region having a radius and a surrounding region having a thickness greater than the radius, wherein the central region has a chemical composition that is different from the surrounding region.

In addition to one or more of the features described above, or as an alternative to any of the foregoing embodiments, the surrounding region may include sub-regions. The sub-regions may have a thickness greater than or equal to 30 nanometers (nm).

BRIEF DESCRIPTION OF THE DRAWINGS

The following descriptions should not be considered limiting in any way. With reference to the accompanying drawings, like elements are numbered alike.

DETAILED DESCRIPTION

Figure 1:
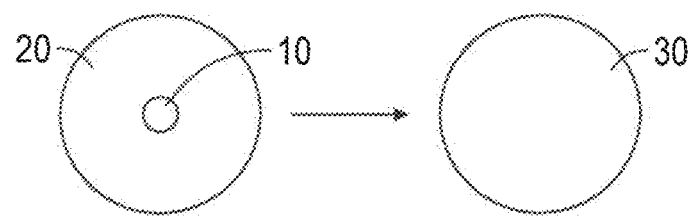
FIGS. 1-3 are cross sections of high temperature fibers.

A detailed description of one or more embodiments of the disclosed apparatus and method are presented herein by way of exemplification and not limitation with reference to the Figures.

A high temperature fiber, as used herein, refers to a fiber which maintains shape and integrity at temperatures greater than or equal to 800° C. A high temperature material, as used herein, is a material that is suitable for use at temperatures greater than or equal to 800° C.

Composites, as used herein, refer to reinforcing materials dispersed in a matrix. Exemplary matrices include polymer, metal, glass, ceramic and glass/ceramic and combinations thereof. Exemplary ceramic, glass and glass/ceramic matrices may include: SiC, SiOC, SiCNO, SiON, SiBCN, SiAlCN, SiC/AlN, $Si_3N_4$, refractory carbides such as boron carbide, hafnium carbide, titanium carbide, and zirconium carbide, borides such as zirconium boride, hafnium boride, tantalum boride, nitrides such as aluminum nitride, zirconium nitride, hafnium nitride and titanium nitride, carbon, aluminum oxide, mullite, AlN, ZrN, HfN, zirconium oxide, borosilicate glasses, aluminosilicate glasses, high silica glasses, oxynitride and oxycarbide glasses, phosphate glasses, and combinations thereof.

Composites exhibit a significant amount of damage tolerance when under an applied load. In ceramic matrix composites (CMC) in particular, this damage tolerance is predominantly due to the formation of multiple matrix cracks that aid in the redistribution of stresses. However, the formation of matrix cracks can result in environmental exposure to the fiber which can result in fiber oxidation or other undesirable degradation. Some high temperature fibers suffer from creep or a loss of strength after exposure to temperatures greater than 1000° C. for an extended period of time, typically ranging from minutes to tens to hundreds of hours or more depending on the application. Additionally, a coefficient of thermal expansion (CTE) mismatch between the fiber and matrix can contribute to composite cracking and loss of strength.

Described herein is a method of making high temperature fibers with a composition and structure designed to reduce CTE mismatch, reduce oxidation, reduce creep/loss of strength after exposure to elevated temperatures, control the interfacial chemistry between the fiber and the matrix, reduce environmental degradation, or a combination thereof. The method includes chemically bonding a high temperature material to a fiber template using atomic layer deposition to form a precursor fiber and further processing the precursor fiber to form the high temperature fiber. Exemplary processing methods include thermal heating, plasma treatment or exposure to other types of radiation (e.g. ultraviolet, terahertz, ultrasonic, microwave, X-ray, neutron irradiation) or combinations thereof. The resulting high temperature fiber can have a composition with different properties at the exterior of the fiber compared to the center of the fiber due to compositional, microstructural or crystallographic variation.

The fiber template may include aluminum oxide, zirconium oxide, yttrium oxide, titanium dioxide, mullite, aluminosilicate, zirconium oxide, yttrium aluminum garnet, SiC, SiNC, SiOC, SiCNO, SiBCN, BN, $Si_3N_4$ SiAlCN SiC/AlN, geopolymers, basalt, a carbide such as boron carbide, HfC, ZrC, carbon, S-glass, E-glass, A-glass, D-glass, silica, and combinations thereof. In some embodiments, the fiber template may comprise one or more of a CG Nicalon fiber, a Hi-Nicalon fiber, a Hi-Nicalon Type S fiber, a Sylramic fiber, a Sylramic iBN fiber, a Tyranno ZMI fiber, a Tyranno SA fiber, a Tyranno SA3 fiber, and any other type of carbon-based, silicon-based or carbide fibers. The fiber template may be a solid rod or a hollow tube.

The material deposited on the fiber template may include a nitride, carbide, boride, oxide, phosphide, selenide, silicide, precursors to the foregoing, or combination thereof including mixed compounds, solid solutions, and high entropy ceramic or metal phases. Exemplary nitrides, carbides, and borides include boron nitride, titanium nitride, aluminum nitride, silicon nitride, zirconium nitride, hafnium nitride, tantalum nitride, niobium nitride, aluminum carbide, silicon carbide, zirconium carbide, titanium carbide, hafnium carbide, tantalum carbide, niobium carbide, boron carbide, titanium diboride, zirconium diboride, and hafnium diboride. Exemplary oxides include oxides of aluminum, silicon, titanium, vanadium, chromium, iron, cobalt, nickel, zinc, magnesium, calcium, strontium, barium, hafnium, zirconium, niobium, tantalum, the rare earths, tungsten, molybdenum, and combinations thereof. Exemplary metals include refractory metals such as hafnium, tantalum, niobium, molybdenum, tungsten, and rhenium, rare earths such as yttrium, lanthanum, neodymium, ytterbium, cerium, and lutetium, and precious metals such as palladium, platinum and rhodium. Exemplary solid solutions and covalent networks include SiC/AlN, BN/AlN, and BNC.

The material is deposited by atomic layer deposition (ALD) to form a precursor fiber. The precursor fiber includes the deposited material chemically bonded to the fiber template. The deposited material is present in an amount greater than would be considered a coating. In the area of high temperature fibers a coating would be an amount of material that results in a thickness less than the radius of the fiber. The deposited material disclosed herein has a thickness greater than the radius of the fiber template and after processing (as discussed below) results in a surrounding region with a thickness greater than the radius of the central region. The deposited material may have a thickness greater than or equal to 30 nm.

When the fiber template is a solid rod the material is deposited on the exterior surface. When the fiber template is a hollow tube the material may be deposited on the interior of the tube, the exterior of the tube or both. The deposited material undergoes modification during further processing. Modifications include additional chemical reactions, alterations to microstructure, alterations to crystalline phases, alterations to grain size, and combinations thereof.

It should be appreciated that the material may be deposited onto a single multifilament tow or on fabrics that include multiple multifilament tows. Fabrics may be woven or non-woven, uniformly constructed or contain intentional bias or density variations. The material may be deposited at temperatures from ambient or room temperature to 800° C., or 250° C. to 500° C. The temperature may be determined based at least in part on, or otherwise as a function of, the precursor chemistries, composite type, fiber type, and/or the desired crystalline content.

The precursor fiber is processed to form the high temperature fiber. Exemplary processing conditions include thermal or radiation exposure to temperatures of 500° C. to 2300° C. for times from seconds to hours. Exemplary atmosphere conditions include high or low vacuum, inert or reactive gas exposure with controlled levels of moisture or water vapor. Typical inert gasses include argon, helium and nitrogen, while typical reactive gasses are air, oxygen, carbon monoxide, methane, hydrogen, ammonia, silicon monoxide, carbon monoxide and mixtures thereof.

The fiber template may be pretreated prior to chemical bonding. Exemplary pretreatments include thermal or radiation exposure for times from seconds to hours. Atmosphere conditions include high or low vacuum and exposure to inert or reactive gases. Exemplary reactive gases are discussed above.

The microstructure and composition of the high temperature fiber may be manipulated by the conditions employed prior to making the fiber, while making the fiber, or after making the fiber. Exemplary variables that can contribute to the microstructure and composition include the volume of the fiber template relative to the volume of the deposited material, the molar ratio of deposited materials when combinations of deposited materials are used as well as the processing conditions (temperature, time, atmosphere, frequency, and number of cycles). Processing may result in diffusion from the deposited material to a more centrally located region, inter-diffusion between regions, doping, chemical reactions and the like.

FIG. 1 shows a small diameter fiber template 10 chemically bound to a high temperature material 20 of the same composition but of greater volume which becomes a larger, essentially homogenous fiber 30 after processing. It is also contemplated that a small diameter fiber template may be chemically bound to a high temperature material of a different composition resulting in a core/shell type architecture.

Figure 2:
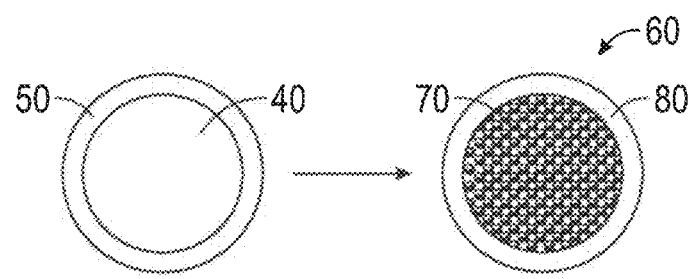

FIG. 2 shows a large diameter fiber template 40 chemically bound to a high temperature material 50 of the same composition but smaller volume which becomes a larger fiber 60 having an interior portion 70 having a larger grain size and an exterior portion 80 having a smaller grain size.

Figure 3:
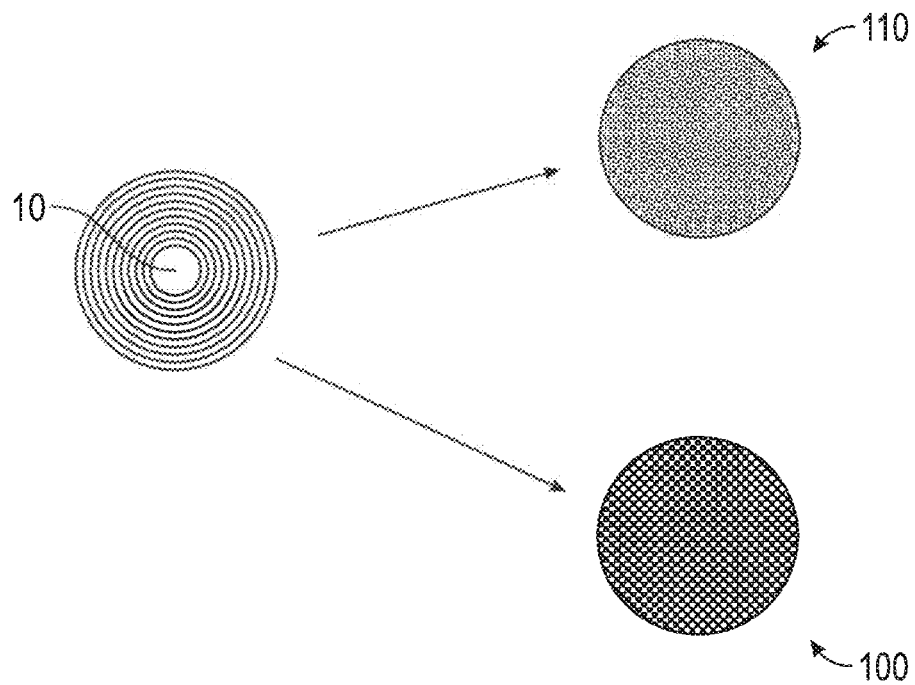

FIG. 3 shows a small diameter fiber template 10 with alternating layers of deposited materials of different compositions. While evenly sized layers are shown, the thickness of the layer may actually vary. Similarly, while two types of layers are shown this should not be construed as limiting and multiple layers and multiple patterns of layers are envisaged.

The molar ratio of the different high temperature materials may affect the microstructure of the product fiber. If one high temperature material (such as AlN) is employed in a very small amount (such as less than 5 mol %) relative to the other high temperature material (such as SiC) a doped high temperature fiber 100 results. If one high temperature material is used in a slightly larger amount (5-45 mol %) a two or more phase microstructure 110 may result. The compositions of the layers may be selected to be relatively inert to each other, in that they are not expected to substantially react with each other during processing or during intended use at high temperatures. In other situations, the compositions of the layers may be selected to be reactive towards each other so that a new phase or phases, microstructure or the like are formed following processing or exposure to the environmental conditions of intended use.

One of skill in the art will appreciate that the fiber template may vary in size to give different volume ratios of template to chemically bound material for any of the foregoing embodiments.

The high temperature fiber may be incorporated in a matrix to form a composite. Exemplary matrices include polymer, metal, glass, glass-ceramic and ceramic. The composite may be used to form all or part of an article. Exemplary articles include friction parts (particularly those employed in brakes), compressor and turbine airfoils, including blades, stators, vanes, and mid-turbine frames, combustion chamber parts including liners and panels, and other engine components including pistons, rods and valves, blade outer air seals, exhaust structures including flaps and seals and engine cases.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making a high temperature fiber comprising:
   chemically bonding material to a fiber template at a first temperature to form a precursor fiber, the material bonded to the fiber template having a thickness greater than a radius of the fiber template; and
   processing the precursor fiber at a second temperature to form the high temperature fiber;
   wherein the first temperature does not equal the second temperature, and the first temperature is 250° C. to 500° C.;
   wherein the high temperature fiber is a fiber which maintains shape and integrity at temperatures greater than or equal to 800° C.; and
   wherein processing the precursor fiber to form the high temperature fiber further comprises additional chemical reactions, alterations to microstructure, alterations to crystalline phases, alterations to grain size, or combinations thereof;
   wherein the fiber template comprises aluminum oxide, zirconium oxide, yttrium oxide, titanium dioxide, mullite, aluminosilicate, zirconium oxide, yttrium aluminum garnet, SiC, SiNC, SiOC, SiCNO, SiBCN, BN, $Si_3N_4$, SiAlCN, SiC/AlN, geopolymers, basalt, a carbide such as boron carbide, HfC, ZrC, S-glass, E-glass, A-glass, D-glass, silica, and combinations thereof.

2. The method of claim 1, wherein the fiber template comprises aluminum oxide, zirconium oxide, yttrium oxide, titanium dioxide, mullite, aluminosilicate, zirconium oxide, yttrium aluminum garnet, BN, $Si_3N_4$, geopolymers, basalt, S-glass, E-glass, A-glass, D-glass, silica, and combinations thereof.

3. The method of claim 1, wherein the fiber template comprises a hollow tube and chemically bonding the material to the fiber template occurs on the inside of the tube, the outside of the tube or both.

4. The method of claim 1, wherein the material bonded to the fiber template comprises a nitride, carbide, boride, oxide, phosphide, selenide, silicide, precursors to the foregoing, or combination thereof.

5. The method of claim 1, wherein processing comprises exposure to temperatures of 500 to 2300° C.; and
   wherein the thickness of the material bonded to the fiber template after processing is greater than or equal to 30 nm; and
   wherein the thickness of the material bonded to the fiber template after processing has a thickness greater than the radius of a central region of the fiber template.

6. The method of claim 1, wherein chemically bonding occurs by atomic layer deposition; and
   wherein the high temperature fiber comprises a first region and a second region, and the first region surrounds the second region and the average grain size of the first region is less than the average grain size of the second region.

7. The method of claim 1, further comprising pretreating the fiber template before chemical bonding, wherein pretreating comprises thermal or radiation exposure.

8. The method of claim 1, wherein the high temperature fiber comprises a central portion and the central portion comprises a doped composition.

9. The method of claim 8, wherein the high temperature fiber consists of the central portion.

10. The method of claim 1, wherein the high temperature fiber comprises a central portion and the central portion comprises more than one phase.

11. The method of claim 10, wherein the high temperature fiber consists of the central portion.

\* \* \* \* \*